Sept. 13, 1966  P. A. WOLFF  3,271,964
METHOD OF OPERATING A SUBMERSIBLE BARGE FOR SUBMARINE OPERATIONS
Original Filed Oct. 21, 1955  6 Sheets-Sheet 1

INVENTOR
PAUL A. WOLFF
BY Shanley & O'Neil
ATTORNEYS

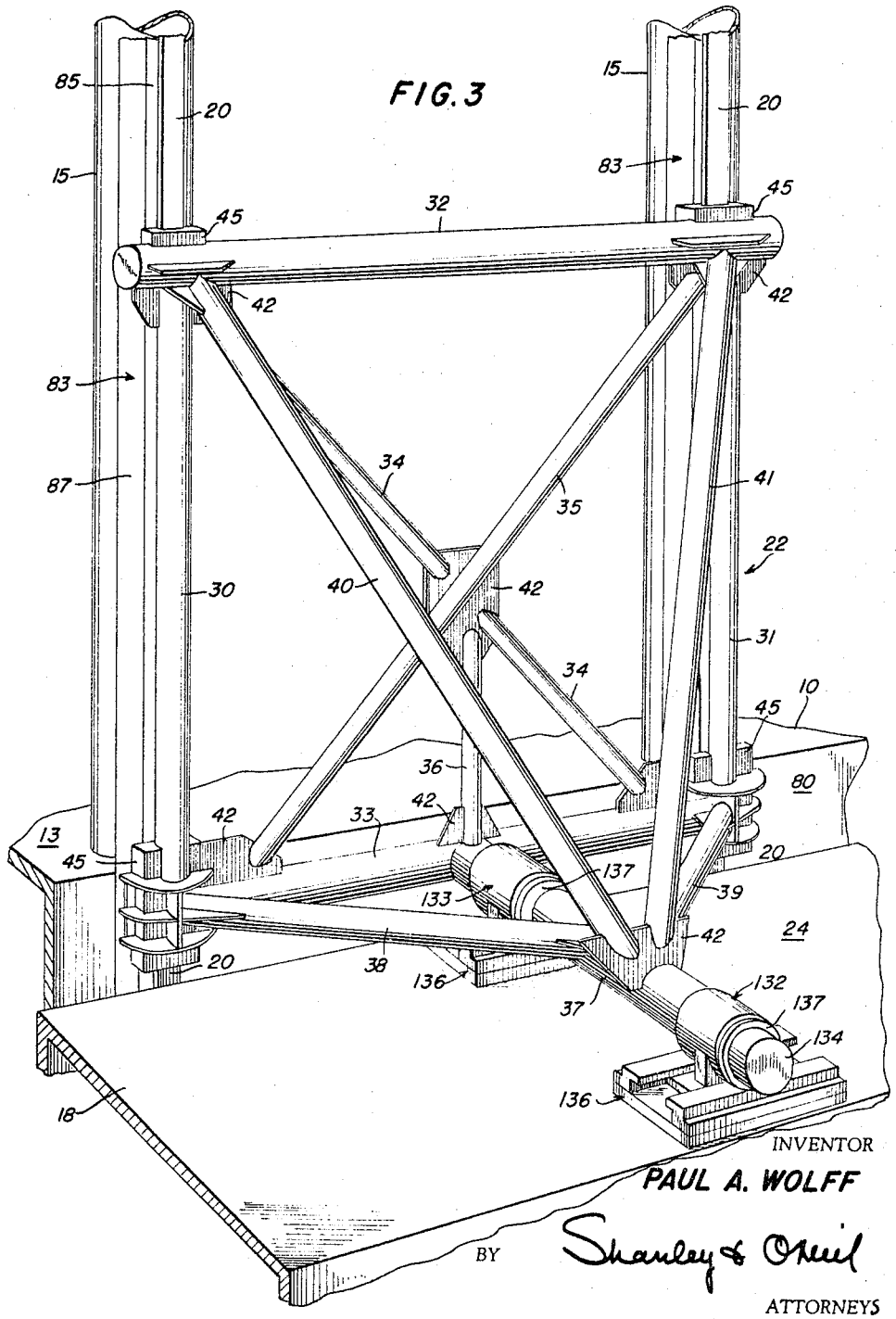

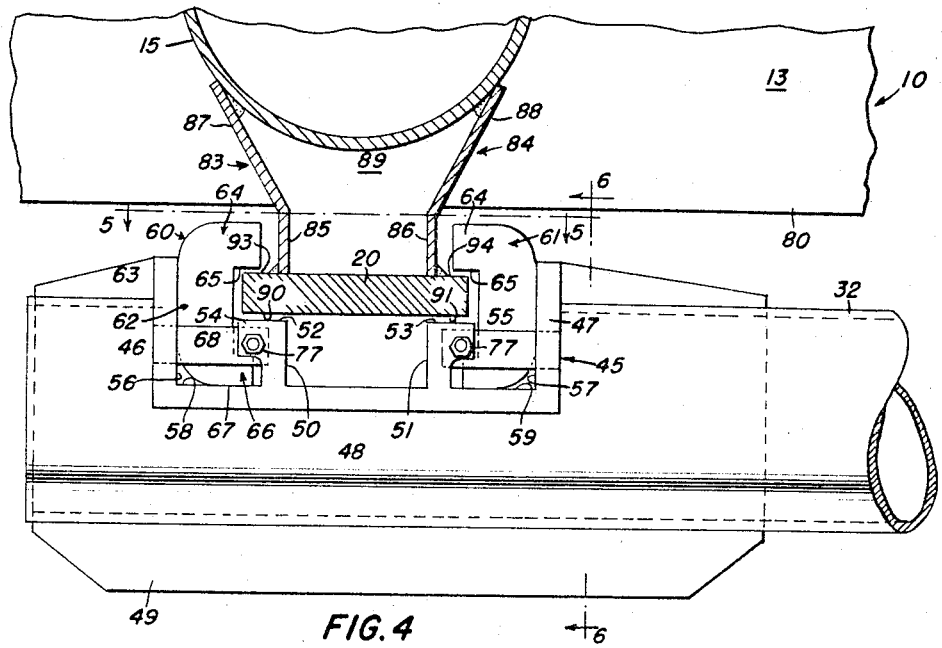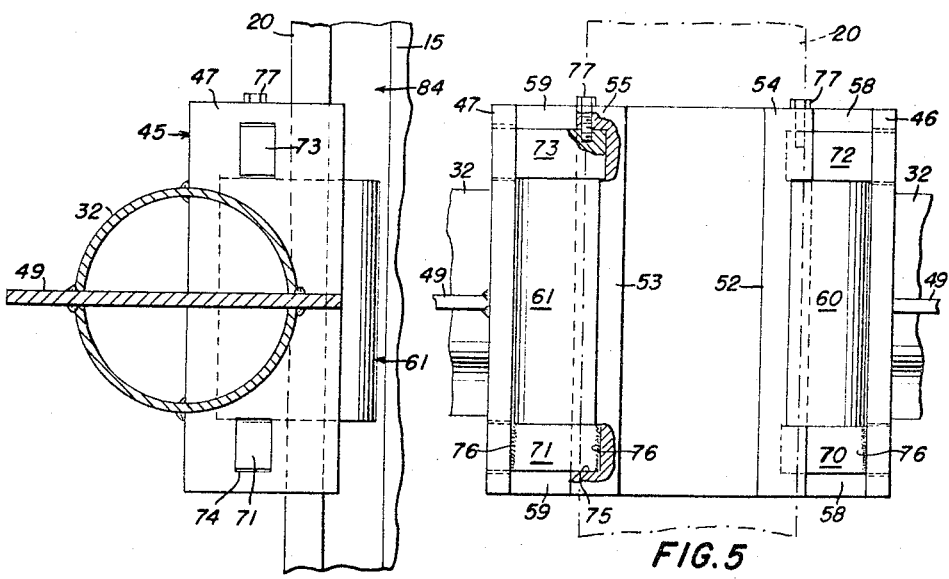

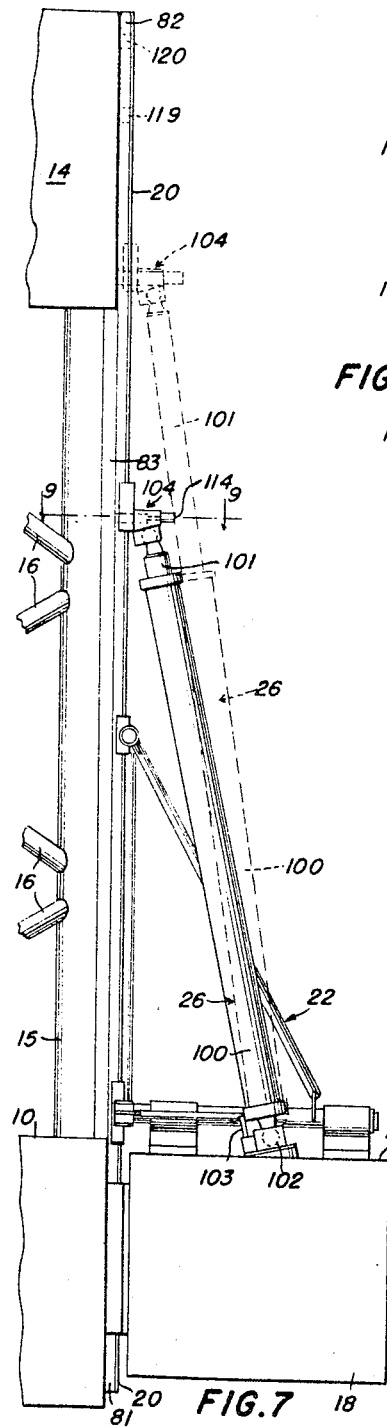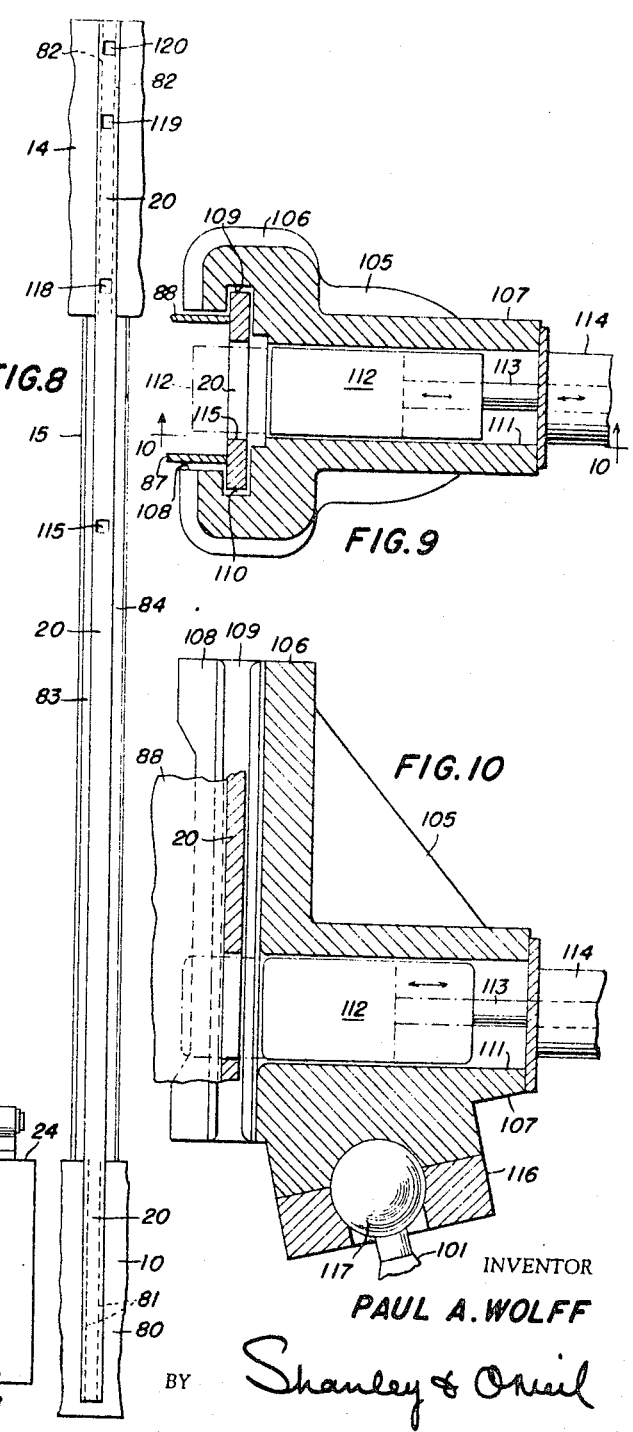

Sept. 13, 1966  P. A. WOLFF  3,271,964
METHOD OF OPERATING A SUBMERSIBLE BARGE FOR SUBMARINE OPERATIONS
Original Filed Oct. 21, 1955  6 Sheets-Sheet 5
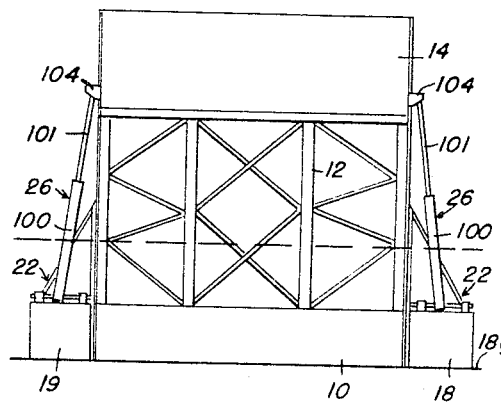
FIG. 20
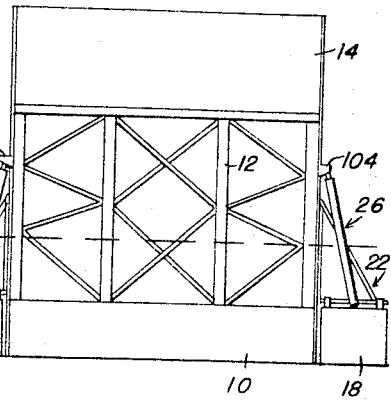
FIG. 21
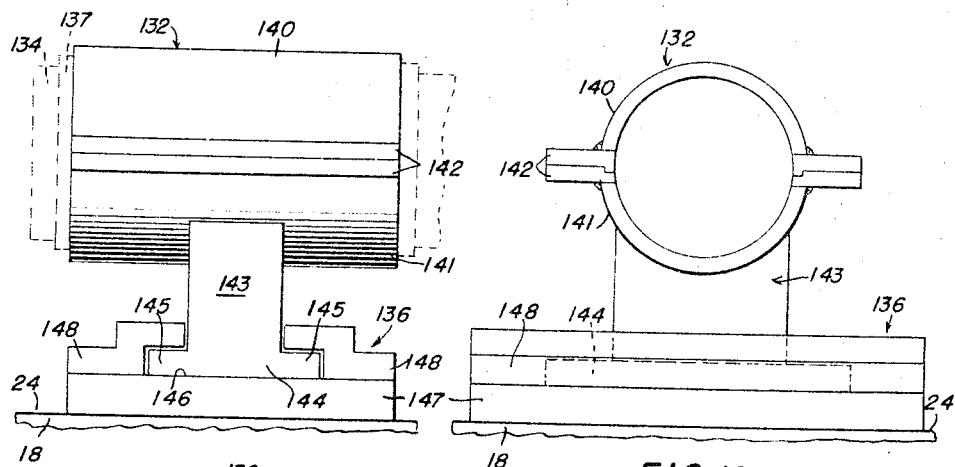
FIG. 11
FIG. 12
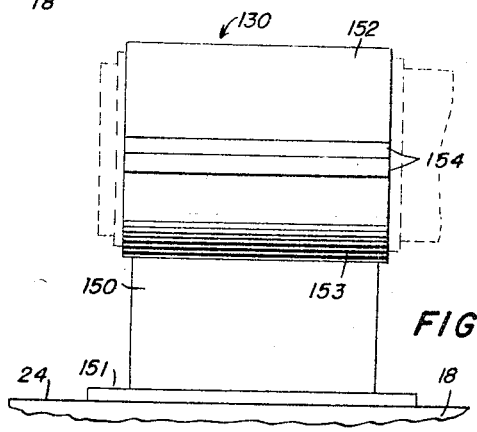
FIG. 13
INVENTOR
PAUL A. WOLFF
BY Shanley & O'Neil
ATTORNEYS Sept. 13, 1966        P. A. WOLFF        3,271,964
METHOD OF OPERATING A SUBMERSIBLE BARGE FOR SUBMARINE OPERATIONS
Original Filed Oct. 21, 1955        6 Sheets-Sheet 6

INVENTOR
PAUL A. WOLFF
BY Shanley & O'Neil
ATTORNEYS

United States Patent Office 3,271,964
Patented Sept. 13, 1966

3,271,964
METHOD OF OPERATING A SUBMERSIBLE BARGE FOR SUBMARINE OPERATIONS
Paul A. Wolff, Morgan City, La., assignor to Kerr-McGee Oil Industries, Inc., a corporation of Delaware
Original application Oct. 21, 1955, Ser. No. 541,998, now Patent No. 3,099,912, dated Aug. 2, 1963. Divided and this application Nov. 30, 1961, Ser. No. 161,761
6 Claims. (Cl. 61—46.5)

This is a division of application Serial No. 541,998 filed October 21, 1955, now Patent No. 3,099,912.

This invention relates to improvements in submersible barges for submarine operations such as submersible barges designed for off-shore deep well drilling operations.

The prior art includes submersible barges adapted for submarine operations, such as off-shore drilling operations, of the type including a main structure adapted to carry equipment for submarine operations and having a hull, and relatively movable pontoons associated with the main structure for stabilizing the barge especially during submergence and refloating operations. The hull and the stabilizing pontoons are compartmented and means are provided for adding or removing water ballast from the compartments to control their buoyancy. The relative movement required during submergence and refloating operations between the main structure and the pontoons is obtained by adding or removing ballast, usually water, to or from the hull or pontoons, and in some cases flexible connections, such as wire ropes, are joined between the relatively movable main structure and the pontoons to control the rate of relative movement of the main structure or the pontoons only in one predetermined direction.

Prior submersible barges, in which relative movement between the main structure and the pontoons is obtained by controlling their buoyancy, are limited to relatively shallow submarine operations, while the type of prior submersible barges including flexible connections between the relatively movable main structure and pontoons, although capable of deep submarine operations, are subject to serious instability problems when operating in bad weather, as in the presence of heavy swells or high winds, for example.

The present invention provides a novel submersible barge, and novel method of operating the same, capable of deep water submarine operations while providing a high degree of stability, even in the presence of unfavorable weather conditions.

According to the present invention, there is provided a submersible barge including a main structure or section having a hull and a stabilizing pontoon section. The pontoon section is mounted for relative movement with respect to the hull to different positions along a predetermined path including a first position in which the center of displacement of the pontoon section is close to the center of displacement of the hull, a second position in which the center of displacement of the pontoon section is displaced above the center of displacement of the hull and to successive positions between the first and second positions. The barge provided by the present invention also includes an arrangement for applying controlled forces between the pontoon section and the hull to effect relative movement between the hull and the pontoon section along the predetermined path in one direction while preventing all other relative movement between the hull and the pontoon section along the predetermined path throughout all relative positions of the hull and the pontoon section between the first and second positions.

Other objects and features of the present invention will appear more fully below from the following detailed description considered in connection with the accompanying drawings which illustrate one embodiment of the invention. It is to be expressly understood however, that the description and drawings are designed for purposes of illustration only and not as a definition of the limits of the invention, reference for the latter purpose being had to the appended claims.

In the drawings, in which similar reference characters denote similar elements throughout the several views:

FIG. 3 is an enlarged isometric view of one of the pontoon supporting structures incorporated in the submersible barge shown in FIG. 1;

FIG. 4 is a plan view, partially in section, of a portion of the supporting structure shown in FIG. 3;

FIG. 5 is a view in section taken along the line 5—5 of FIG. 4;

FIG. 6 is a view in section taken along the line 6—6 of FIG. 4;

FIG. 7 is an enlarged view in elevation of a portion of the aft end of the submersible barge shown in FIG. 1;

FIG. 8 is an enlarged view in side elevation of the portion of the submersible barge shown in FIG. 7;

FIG. 9 is a view in section taken along the line 9—9 of FIG. 7;

FIG. 10 is a view in section taken along the line 10—10 of FIG. 9;

FIG. 11 is a side elevational view of a bearing support shown in FIG. 3;

FIG. 12 is an end elevational view of the bearing support shown in FIG. 11;

FIG. 13 is a side view in elevation of another bearing support employed in the submersible barge shown in FIG. 1;

FIGS. 16, 17, 18, 19, 20 and 21 are diagrammatic representations of the submersible barge during different phases of submerging and refloating operations according to one method provided by the present invention.

Figure 1:
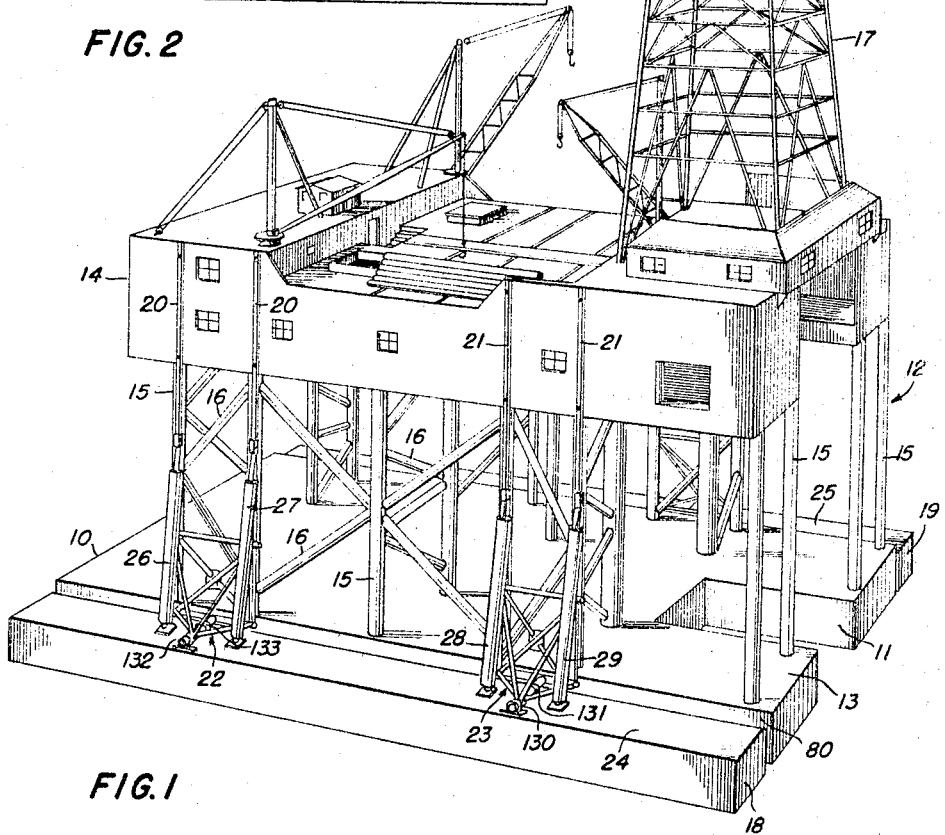
FIG. 1 is a perspective view of a submersible barge constructed in accordance with the principles of the present invention.

With reference more particularly to FIG. 1 of the drawings, a submersible barge constructed in accordance with the principles of the present invention is disclosed therein comprising a main structure or section including a hull 10 of substantially rectangular form provided with a drilling slot 11 extending centrally inwardly from the forward end of the hull, an open work structure 12 extending upwardly from the upper deck 13 of the hull 10 and a working platform 14 supported by the open work structure in spaced relation above the hull 10. The open work structure 12 may comprise a plurality of longitudinally and transversely spaced vertically disposed column members 15, which may be of tubular construction, stabilized by innerconnecting angularly disposed brace members 16. The working platform 14 is adapted to support suitable equipment for a submarine operation, such as a drilling derrick 17 positioned above the drilling slot 11, and provides suitable space for equipment required in connection with the submarine operations as well as quarters for members of the operating crew. The depth of the hull 10 and the height of the column members 15 determine the maximum depth of the submarine operations, the maximum operating depth being less than the combined height of the column members and the hull 10 to provide wave clearance space beneath the working platform. A submersible barge constructed in accordance with the principles of the present invention and designed for offshore drilling operations includes a hull of a depth of approximately 13 feet and column supporting members extending 48 feet above the upper deck of the hull and is capable of performing drilling operations in water depths up to and including approximately 40 feet. It is to be expressly understood, however, that the principles of the present invention may be incorporated in submersible barges having greater maximum operating depth by merely increasing the length of the column supporting members with or without an increase in the depth of the hull as will be more fully understood from the following description.

The submersible barge also includes a pontoon section comprising a pair of pontoons 18 and 19 of elongated rectangular construction arranged outboard the main structure. The pontoons 18 and 19, and the hull 10, are divided into a plurality of ballast compartments, not shown, and means, also not shown, are provided for introducing and removing water ballast from the compartments to control the buoyancy and mass of the pontoon section and the main section. The means for introducing and removing water ballast from the compartments may be of any conventional construction and does not constitute a part of the present invention. For example, the various compartments may be connected to valve controlled conduits leading to a source of water under pressure, which may be supplied by a mechanical pump, for introducing water ballast into the compartments, and an injector pumping arrangement may be provided for withdrawing water ballast from the compartments.

In accordance with the principles of the present invention, the pontoon section is mounted for vertical movement with respect to the hull to different positions along a predetermined path including a first position in which the center of displacement of the pontoon section is close to the center of displacement of the hull, a second position in which the center of displacement of the pontoon section is above the upper deck of the hull and close to the working platform 14 and to successive positions intermediate the first and second positions. The foregoing means comprises a plurality of pairs of elongated guide members 20, 20 and 21, 21 mounted on both sides of the main structure adjacent the aft end and the fore end of the barge, respectively, and adapted to slidably support pontoon carrying frames 22 and 23, respectively, having connections with the upper decks 24 and 25 of the pontoons 18 and 19, respectively. As shown more clearly in FIG. 2, the pontoons 18 and 19 are provided at their aft ends with a pontoon carring frame 22 slidably supported on a pair of guide rails 20, 20, and with a pontoon carrying frame 23 at their force ends slidably supported by pairs of guide rails 21, 21.

The present invention also provides novel means for applying controlled force between the pontoon section and the main structure to move the pontoon section relative to the hull 10, in either direction along the predetermined path between the first and second positions while preventing relative movement along the predetermined path in the opposite direction, as well as for preventing relative movement in either direction along the predetermined path at any position along the path. The above means comprises a pair of double acting hydraulically actuated rams 26 and 27 connected between the pontoons 18 and 19 and the main structure adjacent the aft end of the barge and a pair of double acting hydraulically actuated rams 28 and 29 connected between the pontoons and the main structure adjacent the fore end of the barge. The lower ends of each pair of hydraulic rams are universally secured to the upper deck of respective pontoons on opposite sides of a pontoon carrying frame, with their upper ends universally connected to anchoring means which are adapted to be fixed at predetermined points along the guide rails associated with respective pontoon carrying frames.

The pontoon carrying frames 22 and 23 may be of identical construction and, as shown in FIG. 3, include a pair of parallel vertical members 30 and 31 spaced from each other a distance corresponding substantially to the spacing between pairs of guide rails, such as the guide rails 20, 20. The upper and lower ends of the vertical members are joined to the ends of parallel horizontal members 32 and 33, the vertical and horizontal members being braced in their plane by means of diagonal bracing members 34 and 35 and vertical bracing members 36. The pontoon carrying frames further include a transverse member 37 extending outwardly from the vertical plane of the vertical and horizontal members and having its inner end joined to the mid point of the lower horizontal member 33 and its outer end terminated outboard of the mean longitudinal axis of the pontoon, such as the pontoon 18. The transverse member 37 is positioned with its longitudinal axis perpendicular to the longitudinal axis of the horizontal member 33 and to the plane of the vertical and horizontal members 30, 31, 32 and 33. This perpendicular relationship of the member 37 is maintained by means of horizontal bracing members 38 and 39 having outer ends joined to a medial point of the transverse member 37 and inner ends connected to the region of the joint between the lower horizontal connecting member 33 and the lower ends of the vertical members 30 and 31, and by means of angularly disposed connecting members 40 and 41 having their outer ends joined to a medial point of the transverse member 37 and their inner ends connected to the region of the joint between the upper horizontal connecting member 32 and the upper ends of the vertical members 30 and 31. The pontoon carrying frames are shown with their component members in the form of elongated tubular members in which the ends of connected members are joined together by means of gusset plates 42 which may extend to within the tubular members and terminate in contiguous relation with opposed walls of the tubular members. It is to be expressly understood, however, that the pontoon carrying frames may be constructed from elements having different cross-sectional shapes, such as I-shaped members, for example.

The pontoon carrying frames are supported by respective pairs of guide rails by means of novel coupling arrangements located in housings 45 which may be formed as an integral part of the frames in the region of the joints between the ends of the vertical members 30, 31 and the horizontal members 32, 33. The coupling arrangements may be of similar construction as shown in FIGS. 4, 5 and 6. As shown, the housing 45 is of substantially U-shaped cross section including parallel elongated end portions 46 and 47 having their inner longitudinal edges connected to opposite longitudinal edges of an elongated side portion 48. Portions of the vertical and horizontal members of the frame, such as the members 30 and 32 are cut away in the region of their joint to provide an opening for receiving the housing 45 which may be weldably secured to the tubular members. In order to increase the strength of the connection between the housings and the tubular members, a gusset plate 49 may extend through the tubular member 32 and be notched to encompass the outer periphery of the housing 45 and to be weldably secured thereto. The housing 45 also includes elongated partition walls 50 and 51 extending longitudinally of the side wall portion 48 outwardly from the inside surface of the side wall portion in spaced relation with the end wall portions 46 and 47, respectively, and terminating in coplanar bearing surfaces 52 and 53 spaced inwardly of the housing with respect to the outer free edges of the end portions 46 and 47. The partition walls 50 and 51 are of reduced thickness adjacent the side wall portion 48 to provide portions 54 and 55, respectively, which projects outwardly from respective partition walls in a direction toward the inside surfaces 56 and 57 of the end wall portions 46 and 47, respectively, in spaced relation with the inside surfaces 58 and 59 of the side wall portion 48 between corresponding end wall portions and partition walls. The spaces defined by the internal surfaces of the end portions, corresponding partition walls, and the portion of the side wall between corresponding end portions and partition walls are adapted to receive the inner ends of C-shaped clamping shoes 60 and 61. The clamping shoes 60 and 61 may be of identical construction including an intermediate portion 62 presenting an external bearing surface 63, an outer leg 64 presenting an internal bearing surface 65 and an inner leg 66 presenting an external bearing surface 67 and an internal bearing surface 68. The C-shaped shoes 60 and 61 are proportioned to be received by the housing 45 with the external surface 63 of the intermediate portion 62 lying in contiguous relation with the inside surfaces 56 and 57 of the end wall portions and with the internal surface 67 and the external surface 68 lying in contiguous relation with the internal surfaces 58 and 59 of the end wall portion 48 and the opposed internal surface of the projecting portions 54 and 55, respectively. The clamping shoes 60 and 61 have a depth less than the depth of the housing 45 and are positioned intermediate the top and bottom of the housing by means of lower retaining members 70 and 71 and upper retaining members 72 and 73. The retaining members may be of rectangular cross section and are adapted to be inserted through suitable openings 74 porvided in the end wall portions 46 and 47, across the space between the end wall portions and respective partition walls 50 and 51 into suitable slots 75 formed in the partition walls. The lower retaining members 70 and 71 may be permanently attached to the housing by means of welds 76, while the upper retaining members 72 and 73 are removably retained in the housing by means of studs 77 threadably mounted in the projections 54 and 55 and adapted to engage respective retaining members in the manner shown in FIG. 5.

The guide rails 20 and 21 comprise vertically disposed elongated members of rectangular cross-section rigidly supported by the main structure outboard of the side surfaces of the hull 10, the open work structure 12 and the working platform 14 with the inside and outside surfaces of the guide rails, on each side of the main structure, lying in corresponding parallel common planes perpendicular to the upper deck 13 of the hull 10. Each of the guide rails extend substantially throughout the depth of the working platform 14 and the hull 10 and throughout the height of the open structure 12. As shown in FIGS. 7 and 8, the portions of the guide rails overlying the side walls of the working platform and the hull are secured to the working platform and the hull in spaced relation therewith by means of pairs of spaced parallel elongated members 81, 81 and 82, 82 welded throughout their length to the inside surface of the guide rails, inwardly of their longitudinal edges, and to the external surfaces of the working platform and the hull. The manner in which the portions of the guide rails are attached to the open frame structure 12 is illustrated in FIG. 4. As shown, a pair of elongated members 83 and 84, extending throughout the length of the column members 15 between the upper deck 13 of the hull 10 and the lower surface of the working platform 14, include spaced parallel portions 85 and 86 having their outside longitudinal edges weldably secured in perpendicular relation to the inside surface of the guide rails inwardly of the side edges of the guide rails. The elongated members 83 and 84 also include portions 87 and 88 having their outer longitudinal edges joined to the inner longitudinal edges of respective parallel portions 85 and 86 and inclined away from each other and extended into contact with the sides of a column member 15 and welded thereto. As seen from FIGS. 1 and 2, a column member 15 is positioned at the desired location of each of the guide rails 20 and 21. In order to increase the strength of the guide rail supporting structure, a plurality of vertically spaced horizontally disposed plates 89 are weldably secured within the space defined by the guide rail, the elongated members 83 and 84 and a portion of the column member 15. Also, a plurality of vertically spaced horizontally disposed plates or diaphragms may be similarly secured between the elongated members 81, 81 and 82, 82.

As shown more clearly in FIG. 4, the partition walls 50 and 51 of the housing are spaced relative to the width of the guide rails, such as a guide rail 20, so that outer marginal areas 90 and 91 of the outside surface of the guide rail overlie the bearing surfaces 52 and 53 for bearing contact therewith upon the pontoons being moved inwardly toward the hull 10. Also, the legs 64 and 66 of the C-shaped shoes 60 and 61 are proportioned to space the internal bearing surfaces 65 of the legs 64 from respective bearing surfaces 52 and 53 a distance greater than the thickness of the guide rail and the C-shaped shoes are positioned relative to each other with respect to the transverse dimension of the guide rail so that the legs 64 project inwardly beyond the outer longitudinal edges of the guide rail to position the interior bearing surfaces 65 in overlying relation with outer marginal areas 93 and 94 of the inside surfaces of the guide rail projecting outwardly from the supporting members 81, 82, 85 and 86. With this arrangement, upon the pontoons moving outwardly with respect to the hull 10, bearing contact is established between the internal bearing surfaces 65 of the leg 64 and the marginal areas 93 and 94 on the inside surface of the guide rail.

It is to be expressly understood that each of the housings 45, located at the upper and lower ends of the vertical members 30 and 31 of each of the pontoon carrying frames includes an attaching arrangement similar to the structure shown in FIGS. 4, 5 and 6 as described above. Inasmuch as greater forces may exist at the points of connection between the guide rails and the lower ends of the pontoon carrying frames, the attaching arrangements in the housings at the lower ends of the members 30 and 31 may be of increased depth to provide additional bearing area between the contacting surfaces. Otherwise, the bearing attachments may be of similar construction.

The attaching arrangements of the housings 45 of each of the pontoon carrying frames are designed so that the pontoons may be easily attached to and removed from the main structure. When it is desired to detach the pontoons, the upper retaining members 72 and 73 are removed from the housing by first unthreading the retaining studs 77. The C-shaped shoes 60 and 61 may then be removed upon upward movement relative to the housing, preferably with the pontoon stationary with respect to the main structure and with the bearing surfaces 52 and 53 in contact with the marginal areas 90 and 91 of the guide rail. Lifting lugs, not shown, may be provided on the upper ends of the shoes for use in their removal. When the retaining shoes are removed from the housings of the pontoon carrying frames of a pontoon, the pontoon may be floated away from the main structure. The pontoons may be attached to the main structure by reversing the above procedure.

It should be noted that the arrangement provided by the present invention for attaching the pontoon carrying frames to the guide rails allows limited relative inboard and outboard movement between the pontoons and the main structure. Thus, when an inwardly moving force is applied to pontoons, the pontoons move inwardly toward the main structure to establish bearing contact between the marginal areas 90 and 91 on the outer surface of the guide rails and the bearing surfaces 52 and 53 presented by the housing, and upon an outwardly moving force being applied to the pontoons, the pontoons move outwardly a predetermined distance to establish bearing contact between the marginal areas 93 and 94 on the inside surface of the guide rail and the internal bearing surfaces 65 of the legs 64. This arrangement eliminates problems that would be present in an arrangement in which bearing contact is simultaneously maintained on both sides of the guide rails. If desired, the bearing surfaces of the housing 45 and the retaining shoes 60 and 61 may comprise inserts of suitable bearing metal to provide long life as well as an arrangement for establishing and maintaining the required clearances between the bearing surfaces by means of shims.

As mentioned above, a pair of double acting hydraulic rams 26 and 27 are connected between the pontoons 18 and 19 and the main structure adjacent the aft end of the barge, and a pair of double acting hydraulic rams 28 and 29 are connected between the pontoons 18 and 19 and the main structure adjacent the fore end of the barge. Also, the hydraulic rams 26 and 27 are located on opposite sides of the pontoon carrying frames 22, while the hydraulic rams 28 and 29 are located on the opposite sides of the pontoon carrying frames 23. The hydraulic rams may be of similar construction and each may be connected between the main structure and respective pontoons as shown in FIGS. 7, 8, 9 and 10.

As shown, the hydraulic ram 26 includes a cylinder portion 100 and a piston portion 101. The piston portion is provided with a piston, not shown, carried at its lower end and slidably mounted in the cylinder portion and adapted to be subject to fluid pressure on its opposite sides to positively move the piston portion 101 in either direction with respect to the cylinder portion 100. Suitable hydraulic connections, not shown, are provided for introducing fluid pressure into the hydraulic ram. The barge is provided with suitable sources of fluid pressure and a control circuit, not shown, for selectively actuating the hydraulic rams in a manner described fully below. The lower end of the cylinder portion is universally connected to the upper deck 24 of the pontoon 18 by means of a universal joint 102 provided with a parallel link connection 103 to prevent rotation of the ram. The universal joint is located slightly outboard of the mean longitudinal axis of the pontoon deck in a plane perpendicular to the side surface 80 of the hull and passing through the central longitudinal axis of one of the guide rails 20.

The upper end of the piston portion 101 is detachably secured to the guide rail 20 at different predetermined vertically spaced points along the guide rail by means of a connecting device 104. As shown more particularly in FIGS. 9 and 10, the connecting device 104 comprises a housing 105 having a vertically disposed body portion 106 and a horizontally disposed body portion 107. The body portion 106 is provided with a substantially wide groove 108 in its outer face extending longitudinally throughout the depth of the body portion. The groove 107 extends inwardly from the outer face and terminates in communication with a pair of diametrically opposed transversely disposed longitudinally extending slots 109 and 110. The groove 108 is of sufficient width to receive the spaced parallel supporting members of the guide rail, such as the supporting members 87 and 88, and the transversely disposed grooves 109 and 110 are proportioned to receive the longitudinal edges of the guide rail which project outwardly beyond the supporting members 87 and 88 to slidably support the connecting device 104 on the guide rail. The body portion 107 is provided with a horizontally disposed passageway 111 of rectangular cross-section which slidably receives a rectangular retaining member 112. One end of the retaining member 112 is connected to actuating rod 113 of a hydraulic cylinder 114 operable upon energization to reciprocate the retaining member 112 between a first position shown in full lines in FIG. 9 and a second position shown in broken lines. A rectangular opening 115 is formed in the guide rail 20 between the supporting members 87 and 88 to provide a passageway through the guide rail for receiving the retaining member upon movement of the retaining member to and from the second position. The body portion 107 includes a downwardly depending housing 116 designed to receive a ball connector 117 secured to the upper end of the piston portion 101 and universally join the hydraulic ram to the connecting device 104.

In addition to the openings 115, each guide rail is provided with a plurality of similar openings 118, 119 and 120 vertically spaced above the opening 115, as shown in FIG. 8. Each of the openings 118, 119 and 120, like the opening 115, is adapted to receive the retaining member 112, when moved into alignment therewith, to rigidly anchor the upper end of the piston portion 101 to the guide rail at the points of the openings. The lowermost openings 115, establishing the first anchor point, are located a predetermined distance above the deck of the hull so that, upon the upper ends of the piston portions 101 being anchored to respective guide rails at that point, the center of displacement of the pontoon section will be close to the center of displacement of the hull with the hydraulic rams in a substantially fully contracted condition. This relationship is shown in full lines in FIG. 7. The next higher openings 118, which establish the second anchor point, are positioned above the first anchor point a distance substantially corresponding to the effective stroke of the hydraulic rams, while the next higher openings 119 at the third anchor point are spaced a similar distance above the openings 118. The openings 120 are located at the top of the guide rails and may be spaced a distance equal to or less than the effective stroke of the hydraulic rams. It is to be expressly understood that any number of openings or anchor points may be provided along the guide rails, the number and the spacing therebetween ordinarily being determined by the effective stroke of the hydraulic rams and the operating depth of the barge. In FIG. 7 the ram 26 shown in broken outline is illustrated in extended condition joined to the guide rail at the second anchor point.

In accordance with another feature of the present invention the pontoon carrying frames 23 at the fore end of the barge are attached to the upper decks 24 and 25 of the pontoons 18 and 19 by means of transversely spaced bearings 130 and 131 rigidly secured to the upper decks of the pontoons, while the pontoon carrying frames 22 at the aft end of the barge are attached to the pontoons by means of transversely spaced bearings 132 and 133 secured to the upper decks of the pontoons for sliding movement longitudinally of the pontoons. As shown in FIG. 3, the transverse member 37 of the pontoon carrying frames 22 includes a portion 134 extending outwardly beyond the region of connection of the bracing members 38, 39, 40 and 41, and a portion 135 inboard of the connecting region. The portions 134 and 135 are rotatably supported by bearings 132 and 133, respectively, attached by a sliding carriage structure 136 to the upper deck 24 of the pontoons. Retaining collars 137 may be positioned on the portions 134 and 135 on opposite sides of the bearings.

The bearings 132 and 133 may be constructed as shown in FIGS. 11 and 12. The bearing 132 may include a movable upper housing 140 and a relatively stationary lower housing 141, each of the housings being provided with connecting flanges 142. The lower housing 141 is supported by a column member 143 including a flat rectangularly shaped bearing plate 144 at its lower end having side portions 145 extending outwardly beyond the support 143. The bearing plate 144 is adapted to slidably contact a bearing surface 146 presented by a bearing member 147 rigidly secured, by any suitable means, to the upper deck 24 of the pontoon 18. Stationary retaining members 148 are rigidly secured to the upper surface of the bearing member 147 on both sides of the bearing plate 144 in sliding contact with the upper and edge surfaces of the bearing plate to prevent relative vertical and transverse movement between the bearing 132 and the pontoon 118 but to allow limited movement of the bearing member 132 longitudinally of the pontoon. The retaining members 148 do not simultaneously contact opposite sides of the bearing plate and the column member and allow limited transverse movement therebetween in a manner corresponding to operation of the sliding connection between the pontoon carrying frames and the guide rails.

The bearings 130 and 131 rotatably supporting the pontoon carrying frames 23 at the fore end of the barge are positively secured to the upper decks of the pontoons by any suitable construction, such as the arrangement shown in FIG. 13. In this figure, a bearing 130 is shown supported by a member 150 positively anchored to the upper deck 24 of the pontoon 18 by means of an anchor plate 151. In other respects the bearings 130 and 131 may be constructed similarly to the bearings 132 and 133 to include a removable upper housing 152 and a stationary lower housing 153 having innerconnecting flanges 154.

Figure 2:
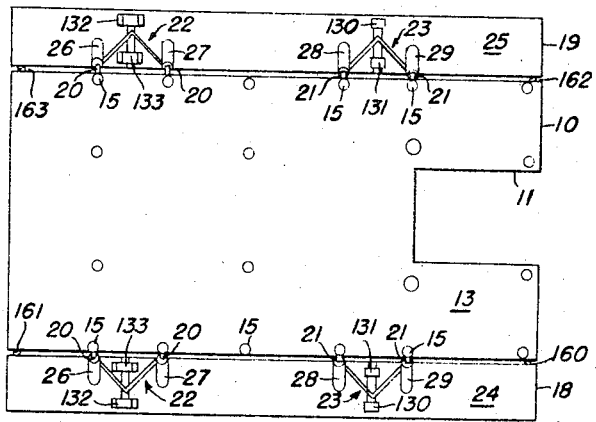
FIG. 2 is a plan view, partially in section, of the submersible barge shown in FIG. 1.
Figures 14, 15:
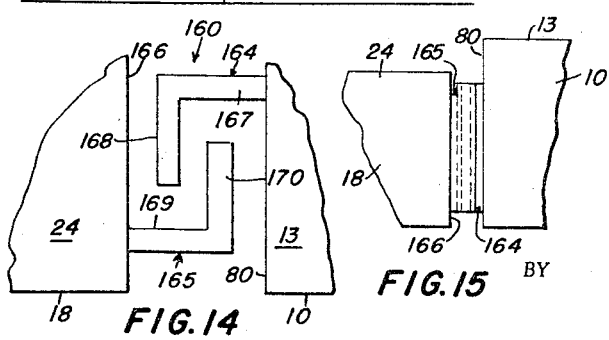
FIG. 14 is a plan view of a portion of the submersible barge shown in FIG. 1 illustrating another feature provided by the present invention.
FIG. 15 is an elevational view of the structure shown in FIG. 14.

During operation of the barge, due to weather conditions or for other reasons, abnormal forces may be present causing the pontoons to move inwardly or outwardly with respect to the main structure and transmit heavy stresses to the pontoon supporting structures. In order to increase the stability of the barge and prevent application of abnormal forces on the pontoon supporting structures, the present invention provides lateral movement restraining means connected between the hull and the pontoons which may or may not but preferably are utilized with resilient fenders supported on the sides of the hull spatially along its length for contact with the inboard sides of the pontoons. The lateral movement restraining means are designed to limit inboard and outboard movement of the pontoons relative to the main structure to a degree less than the total relative inboard and outboard movement between the main structure and the pontoons permitted by the connections between pontoon carrying frames and the guide rails and between the pontoon carrying frames and the pontoons. As shown in FIG. 2, lateral movement restraining means 160 and 161 are positioned adjacent the fore and aft ends of the barge, respectively, between the opposing side surfaces of the pontoon 18 and the hull 10, and lateral movement restraining means 162 and 163 are positioned at the fore and aft ends of the barge, respectively, between the opposing side surfaces of the pontoon 19 and the hull 10. The lateral movement restraining means may be of similar construction and a detailed description of the lateral movement restraining means 160 will be sufficient to fully describe this feature of the invention. As shown more particularly in FIGS. 14 and 15, the lateral movement restraining means 160 includes an elongated angle member 164 secured to the side surface 80 of the hull 10 and an elongated angle member 165 secured to the adjacent side surface 166 of the pontoon 18. The elongated angle member 164 includes a first vertically disposed portion 167 having one longitudinal edge secured to the side surface 80 of the hull in substantially perpendicular relationship with the side surface. The other longitudinal edge of the flange portion 167 is joined to a longitudinal edge of another vertically disposed flange portion 168 extending toward the fore end of the hull parallel to the surface 80. The elongated angle member 165 also includes a vertically positioned flange portion 169 secured in perpendicular relation to the side surface 166 of the pontoon 18, and having its outer longitudinal edge joined to a longitudinal edge of a vertically disposed flange portion 170 extending at right angles from the flange portion 169 in a direction toward the flange portion 167 of the angle member 164. The flange portions 167 and 169 extend outwardly from the side walls 80 and 166, respectively, beyond the parallel flange portions 168, 170 of the other angle member, and the parallel flange portions 168 and 170 extend a sufficient distance toward the other flange portion of the opposite angle member to establish an overlapping relationship as shown in the drawing. In FIGS. 14 and 15, the hull 10 and the pontoon 18 are shown in an intermediate position of the maximum inward and outward movement allowed by the restraining means 160. Thus, inward movement of the pontoon relative to the hull is limited upon contact of the flange portion 170 with the side 80 of the hull and of the flange portion 168 with the side 166 of the pontoon, while outward movement is limited upon contact between the flange portions 168 and 170, the maximum inward and outward movement being limited to the space between the flange portions 168 or 170 and the surfaces 166 and 80, respectively, plus the space between the flange portions, as shown in FIG. 14. According to the present invention, the maximum inward and outward positions of the pontoons relative to the hull 10 is limited by the lateral movement restraining means to positions less than the maximum inward and outward positions of the pontoons relative to the hull as determined by the attaching structure between the pontoon supporting frames and the guide rails and between pontoon supporting frames and the pontoons. With this arrangement the lateral movement restraining means will absorb forces tending to move the pontoons relative to the hull and prevent application of heavy moments about the attaching structure for the pontoon supporting frames. As mentioned above, the lateral movement restraining means may be employed with resilient fenders spatially positioned along the side 80 of the hull and extending substantially throughout the depth of the hull. These fenders have a lateral dimension at least equal to the minimum space between the side surfaces of the pontoons and the hull is determined by the lateral movement restraining means. Thus, forces moving the hull and the pontoons in a direction toward each other are absorbed by the resilient fenders, and the resilient fenders function to add stability to the barge when the pontoons are at their innermost position with respect to the hull. It should be noted from FIG. 15 that the angle members 164 and 165 extend a substantial distance throughout the depth of the pontoon section 18 and the hull to provide a relatively large area of contact between the angle members and also to provide a lateral movement restraining function even when the center of displacement of the pontoons and the hull do not lie in a common horizontal plane which frequently occurs during normal operation of the barge as will appear below. It is to be understood that the lateral movement restraining means may be provided in other forms and this feature of the invention is not limited to the use of spaced right angle members as shown and described above.

Figure 16:
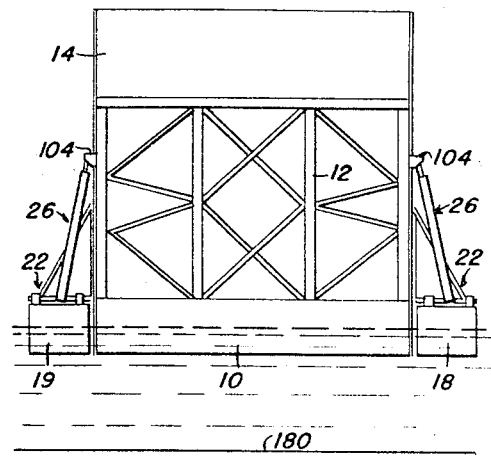

Operation of a submersible barge constructed in accordance with the principles of the present invention will be more fully understood from reference to FIGS. 16 through 21 of the drawings. In FIG. 16, the barge is shown in towing position in which the ballast in the compartments of the hull 10 and the pontoons 18 and 19 is controlled to buoyantly support the barge. In the towing position, the center of displacement of the pontoons substantially corresponds to the center of displacement of the hull, and the hydraulic rams are in a substantially fully contracted position with the upper end of the ram pistons being secured to respective guide rails at the first or lowermost anchor point. The cylinder chambers of the hydraulic rams on opposite sides of the ram pistons are filled with substantially incompressible fluid to prevent relative movement between the piston portion 101 and the cylinder portion 100 and provide rigid connections between the pontoons and the main structure. During towing operations, the pontoons are ordinarily securely tied to the hull by means of wire rope, for example, to prevent relative lateral movement. The lateral movement restraining means 160, 161, 162 and 163 are therefore positioned with the flange portions 168 and 170 in contact with the pontoon side wall 166 and the hull side wall 80, respectively, and function to provide a stable, unitized structure. The provision of resilient fenders as discussed above will further stabilize the barge. Upon the barge reaching location for submarine operations, the hydraulic rams are disconnected from their respective guide rails and are energized with fluid pressure to move the rams into rigid extended positions with their supporting devices 104 in alignment with the next higher opening 118 in the guide rails. The hydraulic cylinders 114 are then actuated to connect the hydraulic rams to the second anchor point. This position of the barge shown in FIG. 17. The rams need not be moved in any specific order; however, in some cases such as when operating in heavy seas, it is advantageous to move the rams one at a time, or to move the rams of each pair successively, to maintain rigid connections between the pontoon section and the main structure.

Figure 17:
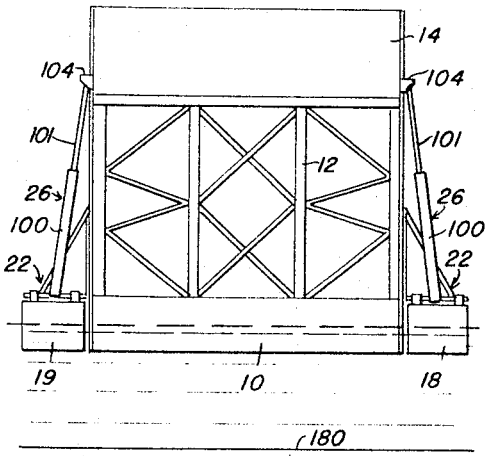

With the barge in the position shown in FIG. 17 the hull may be submerged to the underlying land bottom by varying the mass-buoyance ratio of one of the sections, i.e., the main section or the pontoon section, to thus decrease the buoyant condition of the barge, and by applying controlled force between the sections, by means of the hydraulic rams, to controllably cause the hull to move in a direction toward the underlying land bottom while maintaining the pontoon section with sufficient freeboard to stabilize the barge. The buoyant condition of the barge may be decreased to effect submergence of the hull by varying the mass-buoyance ratio of either of the sections, and the hull submergence may be accomplished with both of the sections buoyant, or with either of the sections non-buoyant and the other section buoyant. Also, as will appear more fully below, during one portion of the hull submergence, one section may be buoyant and the other section non-buoyant, while during another portion of the submergence the one section may be non-buoyant and the other section buoyant.

The term "mass-buoyance ratio," as used throughout this description and in the appended claims, defines the ratio of the mass of a body, such as either of the sections, and its buoyance which determines whether or not the body is buoyant or non-buoyant. Thus, either of the sections may be rendered buoyant or non-buoyant by decreasing or increasing the mass of the sections or by increasing or decreasing the buoyance of the sections, respectively.

According to one method for submerging the hull, the buoyant condition of the barge is decreased by varying the mass-buoyance ratio of the main section upon adding sufficient ballast to the compartments of the hull 10 to render the main section non-buoyant, or preferably slightly non-buoyant.

The term "slightly non-buoyant" as used throughout this description and in the appended claims, defines a condition in which sufficient ballast has been added to the compartments of the hull to reduce the resultant of the buoyance of the hull and the mass of the main section to a degree just insufficient to support the total weight of the main section.

Figure 18:
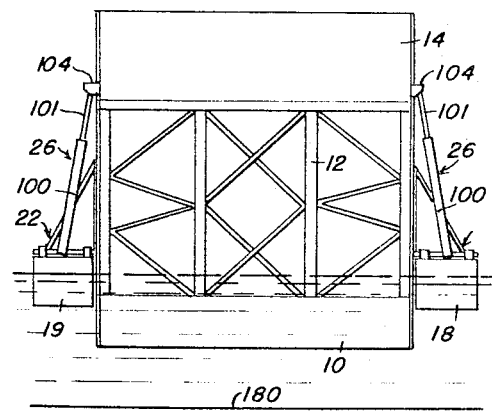
Figure 19:
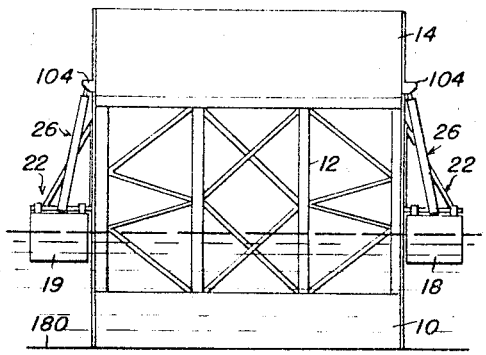

When the main section is rendered non-buoyant, the rams may be contracted under control of hydraulic circuit means associated with the rams to apply controlled force between the sections and controllably effect downward movement of the hull relative to the pontoon section in a direction toward the underlying land bottom, eventually submerging the hull to the land bottom. During this performance, the pontoon section, being buoyant, is maintained with adequate freeboard to stabilize the barge. FIG. 18 illustrates an intermediate position of the hull submergence, while FIG. 19 shows the hull submerged to the load bottom. In both figures, the pontoon section, i.e., pontoons 18 and 19, are shown with adequate freeboard to stabilize the barge It is preferable, as mentioned above, to only add a quantity of ballast to the compartment of the hull to render the main section slightly non-buoyant. Under these conditions the major proportion of the total weight of the main structure is supported by the buoyance of the hull and forces of relatively small magnitude exist tending to submerge the hull. This makes it possible to submerge the hull according to predetermined plans concerning the attitude of the hull during submergence as will be discussed below, and greatly enhance the safety of the operation, since the magnitude of the controlled forces between the sections are proportionately decreased. This feature is especially advantageous when the operation takes place in heavy seas. Under ideal conditions, that is in perfectly calm water, the controlled force between the sections may be negligible providing contraction of the rams is initiated at a time when the main section changes from a buoyant condition to a non-buoyant condition and the rams are contracted at a rate corresponding to the natural submerging of the hull due to the non-buoyant condition of the main section. However, due to the mass of the sections of the barge and the magnitude of the forces involved, and since swells are frequently present producing temporary displacement of the resultant forces of the liquid ballast, or for other reasons, controlled forces of appreciable magnitude may be applied between the sections, and it frequently occurs that controlled forces of different magnitude are applied at different points between the sections. Also, it may be desirable in some cases to control the hydraulic rams in such a manner as to apply controlled forces of predetermined magnitude between the sections to maintain the hull at a desired attitude during its submergence, as well as to control its rate of submergence. For example, it may be desirable to submerge one end of the hull beneath the water surface ahead of the other end, to maintain the hull at such an attitude throughout its submergence causing one end of the hull to be submerged to the land bottom ahead of the other end, or to change the attitude of the hull during its submergence and cause the hull to be submerged to the land bottom in a different manner. While the distribution of ballast in the compartments of the hull influence the attitude of the hull, the provision of hydraulic rams operable to apply controlled forces between the sections provides an arrangement for more accurately establishing and maintaining a desired hull attitude throughout the submergence as well as for compensating for extraneous influences which adversely affect the function of the ballast in maintaining a desired hull attitude.

According to another method provided by the present invention, the buoyant condition of the barge may be decreased by varying the mass-buoyance ratio of the pontoon section and the hull may be controllably submerged upon opertion of the hydraulic rams with the main structure in a buoyant condition. In particular, with the sections of the barge in the positions shown in FIG. 17, the rams may be hydraulically contracted, in a controlled manner, to move the pontoon section relative to the hull 10 along the predetermined path in a direction toward the second position to decrease the buoyance of the pontoons 18 and 19. When the buoyance of the pontoon section is decreased to a degree sufficient to render the barge non-buoyant, the hull will submerge to the underlying land bottom with the barge being stabilized by the pontoon section maintained with adequate freeboard for this purpose. By continuously contracting the hydraulic rams at a rate to apply proper controlled force between the sections, the hull may be submerged to the underlying land bottom in any desired attitude. The main section is in a buoyant condition during this method of hull submergence, and the pontoon section may be buoyant or non-buoyant. For reasons mentioned above, it is preferable to add sufficient ballast to the compartments of the hull 10 to render the main section slightly buoyant. Of course, in the case of a non-buoyant pontoon section, the barge should be rendered slightly buoyant. The terms "slightly buoyant" as used throughout this description and in the appended claims defines a condition in which the resultant of the buoyance of a body, such as the main section or the barge, and the mass of the body is just sufficient to support the total weight of the body. It is to be expressly understood the present invention is not limited to methods in which the main structure is rendered slightly non-buoyant, or the main structure or the barge is rendered slightly buoyant, prior to submergence of the hull, but that these conditions comprise the preferred mode of operation.

The above described methods of submerging the hull with the main section in a buoyant or a non-buoyant condition may be followed during a single submergence of the hull. For example, at the beginning of the submergence operation with the barge in the condition shown in FIG. 17, contraction of the hydraulic rams may be initiated at a time before sufficient ballast has been added to the compartments of the hull to render the main section non-buoyant. Thus, initial submergence of the hull may take place with the main section buoyant, and after sufficient ballast is added to the hull to render the main section non-buoyant, the submergence of the hull may be completed with the main section non-buoyant. It is also possible, during an intermediate phase of the hull submergence, as shown in FIG. 18, to change the main section from a buoyant condition to a non-buoyant condition, and vice versa, during the normal course of the submergence in accordance with a predetermined plan of submergence or in order to compensate for changing conditions. For example, it may be desirable in some cases to submerge the hull during the first half of the submergence with the main section in a buoyant condition and during the second half of the submergence with the main section in a non-buoyant condition. With this procedure, upon structural failure, the hull will move to the water surface or to the underlying land bottom whichever is at the least displacement from the hull at the time of the structural failure.

The relative movement between the pontoon section and the hull as determined by the hydraulic rams is established by controllably exhausting substantially incompressible fluid from the cylinder chambers of the hydraulic rams beneath the ram pistons while at the same time adding fluid to the cylinder chambers above the ram pistons to maintain the latter chambers filled with fluid and hence prevent upward movement of the piston portion 101 relative to the cylinder piston 100. The hydraulic rams thus provide rigid connections between the sections of the barge, which connections are extensible or contractible while maintaining the connections rigid. The main structure therefore may be moved downwardly with respect to the pontoon section at a rate determined by the rate fluid is exhausted from the cylinder chambers beneath the ram pistons, until the hydraulic rams reach their fully contracted condition or until the hull is submerged to the underlying land bottom 180, shown in FIG. 19.

When a non-buoyant structure is allowed to sink, or when a buoyant structure is forceably submerged, such as the main structure, it is not possible to predetermine the attitude of the structure during its submergence. This is especially so when liquid ballast is employed to control the mass of the structure. Therefore, in accordance with the principles of the present invention, fluid is selectively exhausted from the hydraulic rams in such a manner as to maintain the hull in a predetermined attitude during its submergence. Also since upward movement of the piston portions 101 relative to the cylinder portion 100 is prevented throughout the submergence of the hull by maintaining the cylinder chambers on the upper side of the ram pistons at all times filled with fluid, rigid connections are continuously maintained between the pontoon section and the main structure. This feature aids in maintaining stability of the barge during submerging and refloating operations when subject to high winds or swells. Thus, according to the present invention, controlled forces are supplied between the pontoon section and the main section to move the hull relative to the pontoon section in one direction along the predetermined path while preventing relative movement along the predetermined path between the pontoon section and the hull in the other direction.

When the hull is submerged to the underlying land bottom, additional ballast may be added to the compartments of the hull to render the main section non-buoyant to a substantial degree and cause the hull to rest more firmly on the land bottom. Ordinarily the relationship between the mass of the main section and the buoyance of the hull is proportioned to prevent the hull from sinking into the land bottom which generally does not present a solid supporting surface.

After the hull is submerged to the land bottom and its mass-buoyance ratio established in accordance with existing conditions, submergence of the pontoon section may be initiated. This is accomplished by controllably extending the hydraulic rams to move the pontoons 18 and 19 from their position shown in FIG. 19 to the position shown in FIG. 20. This may be accomplished with the pontoon section buoyant, slightly buoyant, non-buoyant or slightly non-buoyant. Ballast may be added to the compartments of the pontoons 18 and 19 to establish the desired buoyant or non-buoyant condition of the pontoon section. Also, by adjusting the ballast and by establishing controlled force between the pontoon section and the main section, by means of the hydraulic rams, the pontoon section may be maintained in any desired attitude during submergence. Upon submergence of the pontoon section to the land bottom, additional ballast may be added to the compartments of the pontoons to render the pontoon section substantially non-buoyant. Thereafter, the hydraulic rams may be disconnected from their respective guide rails and hydraulically moved to their contracted position and connected to their respective guide rails at the lowermost or first anchor point, as shown in FIG. 21. The hydraulic rams may then be operated to apply a downward force onto the pontoons and push the pontoons a greater distance downwardly than the hull to further stabilize the barge and prevent undercurrents from washing away the land bottom beneath the hull.

When the submarine operation is complete and it is desired to refloat the barge, the hydraulic rams are disconnected from the first anchor points of respective guide rails and are hydraulically extended and connected to the second anchor point. Ballast in the compartments of the pontoons may then be adjusted if necessary to render the pontoon section buoyant, slightly buoyant, non-buoyant or slightly non-buoyant. Thereupon the hydraulic rams may be contracted to apply controlled force between the pontoon section and the main section and move the pontoon section to the position shown in FIG. 19. If substantial suction effect exists between the bottom surfaces of the pontoons and the land bottom, it may be relieved by removing ballast from one end only of the pontoons and by hydraulically contracting the hydraulic rams attached adjacent to the same ends of the pontoons. By this action the lower surfaces of the pontoons are moved away from the land bottom progressively from one end to the other to effect a gradual breaking of the suction action between the land bottom and the lower surface of the pontoons without requiring application of forces of substantial magnitude. This method of relieving the suction effect between the pontoons and the land bottom is made possible by the structure provided by the present invention for connecting the hydraulic rams between the pontoons and the main structure and for attaching the pontoon carrying frames to the upper decks of the pontoons. As described above, the upper and lower ends of hydraulic rams are universally connected to the main structure and to the upper decks of the pontoons, respectively, while the pontoon carrying frames are attached to the upper decks of the pontoons by means of spaced bearings, the axis of rotation being perpendicular to the longitudinal axis of the pontoons. Also, the bearings adjacent one end of the pontoons are rigidly attached to the pontoons while the bearings adjacent the other ends of the pontoons are supported by a carriage slidably mounted longitudinally of the pontoons. With this structure, upon upward movement of one end only of the pontoons the hydraulic rams, through their universal connections, carry the developed component forces extending longitudinally of the pontoons, and longitudinal stresses are not developed at the slidable joints between the pontoon carrying frames and the guide rails due to the rotatable connection between the pontoon supporting frames and the pontoons and due to the allowable longitudinal movement provided by the slidable carriage supporting the bearings adjacent one end of the pontoons. Preferably the ends of the pontoons adjacent the pontoon carrying frames supported by the slidable carriages should be lifted first in order to prevent concurrent longitudinal movement of the pontoons relative to the land bottom. After the pontoons are relieved from the land bottom, they may be refloated in any desired attitude, preferably on even keel.

After the pontoon section is moved to the surface of the water and provided with sufficient freeboard to stabilize the barge, the buoyancy of the pontoon section is established in accordance with the method employed to refloat the hull, that is, for example, if the hull is to be refloated with the main structure non-buoyant, the pontoon section must be sufficiently buoyant to support the weight of the main section unsupported by the buoyance of the hull. The hull may be refloated in a buoyant or a non-buoyant condition, and its condition may change from buoyant to non-buoyant, and vice versa, during the refloating operation either according to a pre-arranged plan of procedure or because of circumstances arising during the refloating operation, by varying the ballast in the compartments of the hull. Refloating of the hull is effected by the application of controlled forces between the main section and the pontoon section, upon extension of the hydraulic rams. As in the case of submerging the hull, the attitude of the hull during refloating may be established and changed by the controlled forces and by ballast distribution, and the hull may be refloated at any desired attitude. After the ballast in the hull is established, the suction between the hull and the land bottom may be removed by any conventional method such as by introducing streams of water beneath the bottom surface of the hull and the land bottom at spaced points throughout the area of the hull bottom. The hydraulic rams are then controllably extended to refloat the hull. The rams may then be moved to their position shown in FIG. 16, the pontoon section secured to the main section and the proper ballast maintained in the compartments to establish floating buoyancy of the barge. The barge may then be floated to a new location.

The novel submersible barge structure provided by the present invention allows beginning of movement of the barge from an old location to a new location prior to complete refloating of the hull. Due to the provision of the hydraulic rams the barge may be towed away from its old location at a time after the hull is moved upwardly from the land bottom and before the hull is refloated. This feature of allowing movement of the barge with the hull in a partly submerged condition provides a material saving in time and in some cases may permit moving from one location to another without complete refloating of the hull.

FIGS. 16 through 21 illustrate various relative positions of the hull and pontoons during submergence of the barge to land bottom below a depth of water less than the effective stroke of the hydraulic rams plus the draft of the hull, the depth of water being substantially less than the maximum operating depth of the barge. When it is desired to submerge the barge to land bottom below a depth of water greater than the effective stroke of the hydraulic rams plus the draft of the hull, such as a depth approaching or corresponding to the maximum operating depth, the submergence is accomplished by following the sequence of steps discussed above with the pontoon section, the hull and the hydraulic rams sequentially occupying the position shown in FIGS. 16, 17 and 18 until the hull is submerged below the surface of the water a distance determined by the effective strokes of the hydraulic rams. This position is illustrated in FIG. 19, but of course the hull section is not submerged to the underlying land bottom since a greater depth of the water is present. In order to further submerge the hull to the land bottom, the hydraulic rams of each pair of hydraulic rams 26, 27, 28 and 29 attached to each of the pontoons are unloaded, hydraulically extended, connected to respective guide rails at the next higher opening 119 comprising the third anchor point, and then reloaded. During relocation of the hydraulic rams to the third anchor point, the weight of the main structure not supported by the buoyance of the hull as in the case of submergence of the hull in non-buoyant condition, or the weight of the pontoons supported by the hull in a buoyant condition, is carried by the loaded rams which will be subsequently relocated, or which have been previously relocated, to the third anchor point. Thus the rams may be successively relocated, or one ram of each pair of rams or one ram of groups of rams connected to the same pontoon, may be relocated at the same time. In any event, it is preferable to design the hydraulic rams to individually carry the load ordinarily supported by a pair of rams. After all the hydraulic rams are extended and relocated to the third anchor point, they may be controllably contracted to further submerge the hull. It is to be expressly understood that should the depth of water be such that relocation of the hydraulic rams to the third anchor point of the guide rails be insufficient to allow submergence of the hull 10 to the underlying land bottom, the hydraulic rams may be relocated to the fourth anchor points, represented by the openings 120, and thus allow further submergence of the hull to the underlying land bottom below a depth of water corresponding to the maximum operating depth of the barge as determined by the combined height of the open framework 12 and the depth of the hull.

After the hull 10 is submerged to the underlying land bottom and additional ballast added to increase its non-buoyancy, the pontoon section may be submerged by following the same procedure by which the hydraulic rams are progressively relocated from the highest to the lowest anchor points. Upon complete submergence of the pontoon section, the hydraulic rams may be contracted and relocated at the first anchor points, i.e., openings 115, and thereafter hydraulically operated to apply a downward force onto the pontoons. The barge may be refloated by reversing the foregoing procedural steps.

By utilizing pairs of hydraulic rams having different strokes or by staggering the openings in the pairs of guide rails for each pair of hydraulic rams, an arrangement may be provided for continuously submerging or refloating the hull throughout the maximum operating depth of the barge. In such an arrangement the rams would be designed and located to carry the load ordinarily carried by a pair of rams, and a ram of each pair may be unloaded, contracted or extended as the case may be, to the next higher or lower anchor point, while the other ram of the pair functions to apply controlled force between the main section and pontoon section to effect submergence or refloating of the barge. This arrangement permits a material saving in time especially when operating in water of a depth several times the effective stroke of the rams, while retaining the structural advantages of relatively short rams.

The provision of a plurality of individually controllable hydraulic rams connected between the pontoon section and the main section, with at least one hydraulic ram being located at the fore end and at the aft end of each of the pontoons, allows submergence of the hull and of the pontoons at any desired attitude, such as an attitude in which the horizontal axis of the sections is horizontal or inclined with the fore ends up and the aft ends down and vice versa. The provision of universal connections between the ends of the hydraulic rams and the sections and of rotatable connections between the pontoon supporting frames and each pontoon, one of which is longitudinally slidable relative to the pontoon, allows either of the sections to be submerged with its longitudinal axis inclined, that is at uneven keel, while the other section may be maintained at even keel or at a non-level attitude if desired. Also, the provision of a plurality of hydraulic rams at the fore end and at the aft end of each of the pontoons allows controlled submergence and refloating of the hull and the pontoon section throughout a depth of water materially greater than the effective operating stroke of the hydraulic rams and makes it possible to utilize the advantageous principle of rigid connections between the pontoon section and the main section in submarine operations of the order of 40 feet or more, for example. Furthermore the feature of providing hydraulic rams that may be anchored at different vertically spaced points along their respective guide rails allows the hydraulic rams to be moved into a substantially contracted condition, and thus protect the contracting surfaces of the cylinder portion and piston portion of the hydraulic rams, when the barge is in submerged state for an extended period of time during a drilling operation, or when the barge is in floating condition during its movement from one location to another. The use of hydraulic rams, connected between the pontoon section and the main section, provides means for determining the mass-buoyance ratio of the main section and the pontoon section not only during submerging and refloating operations but also during a submarine operation, such as a drilling operation. Dead weight of the barge, such as water, mud, pipe and other material required for a drilling operation, for example, are permanently removed from the barge as the drilling operation proceeds. Since such materials are of considerable mass, a material reduction in the dead weight of the barge occurs during the drilling operation. In order to maintain the required stability of the submerged barge, the mass-buoyance ratio of the main section, in particular, and of the pontoon section, must be adjusted in accordance with changes in the dead weight of the barge at different points with respect to the center of gravity of the barge. Variations of the forces on the hydraulic rams not only indicate the necessity to adjust the ballast in the compartments of the hull and of the pontoon section but constitute a measure of ballast changes that may be required.

There is thus provided by the present invention a novel submersible barge of the type including a main section and a stabilizing pontoon section capable of operation in relatively deep water of the order of 40 feet or more, for example, as well as novel methods of operating the same. It is to be expressly understood that various changes and substitutions may be made in the specific structure disclosed and described above without departing from the spirit of the invention as well understood by those skilled in the art. For example, the barge may comprise a main structure including a hull and a platform of triangular shape and a pontoon section comprising a plurality of rectangular pontoons each positioned outboard the main section adjacent the sides of the triangular structure, or the main section may be of cylindrical shape including a cylindrical hull and platform joined by open work structure with the pontoon section comprising an annular member, of continuous or discontinuous construction, positioned about the cylindrical main section. Also, if desired, the barge may include a permanently non-buoyant pontoon section which may be constructed of masonry, such as concrete. Reference therefore, will be had to the appended claims for a definition of the limits of the invention.

What is claimed is:

1. Method of operating a submersible barge to effect submergence thereof to the underlying land bottom of a body of water, the barge being of the type having a main section including a floatable hull connected to an upstanding open structure supporting a platform spaced above the hull and a pair of pontoon sections located outboard of the main section on opposite sides thereof with the main section and the pontoon sections being mounted for relative individual movement in upward and downward directions to different positions along predetermined paths including a first position in which the center of displacement of the pontoon sections is at substantially the same level as the center of displacement of the hull, a second position in which the center of displacement of the pontoon sections is displaced a maximum distance above the level of the center of displacement of the hull and successive positions from the center of displacement intermediate the first and second positions, the method comprising the steps of floating the barge on the body of water by the buoyance of the pontoon sections with the hull and the pontoon sections in the first position and each having freeboard, applying a force of controlled variable magnitude between and onto the main section and the pontoon sections and by said force moving the hull at selected rates further from the center of displacement of the pontoon sections in one direction from the first position and toward the land bottom, and restraining movement of the sections relatively upwardly of the first position in a direction opposite said one direction while said force is applied between the hull and the pontoon sections, continuing application of said force and moving thereby the hull relative to the center of displacement of the pontoon sections further in said one direction toward the second position and into contact with the land bottom while continuing said restraining movement of the pontoon sections while continually maintaining the pontoon sections with freeboard to stabilize the barge, and changing the magnitude of the controlled force in accordance with extraneous forces applied to the sections and changes in buoyancy thereof during such submergence to vary the rate and attitude of submergence of the hull to the underlying land bottom.

2. Method of operating a submersible barge as defined in claim 1 including the step of adjusting the mass-buoyance ratio of the main section to render the main section buoyant before application of said force.

3. Method of operating a submersible barge as defined in claim 1 including the step of adjusting the mass-buoyance ratio of the main section to render the main section non-buoyant before application of said force.

4. Method of operating a submersible barge as defined in claim 1 including the step of adjusting the mass-buoyance ratio of the main section to render the main section slightly non-buoyant before application of said force.

5. Method of operating a submersible barge as defined in claim 1 including the steps of adjusting the mass-buoyance ratio of the main section to render the main section buoyant during the first period of submergence of the hull to the land bottom and of adjusting the mass-buoyance ratio of the main section to render the main section non-buoyant during the last period of submergence of the hull to the land bottom.

6. Method of operating a submersible barge as defined in claim 1 in which said force is applied at a plurality of different points between the main section and the pontoon sections.

References Cited by the Examiner

UNITED STATES PATENTS

| | | | |
|---|---|---|---|
| Re. 24,346 | 8/1957 | Dawson | 61—46.5 |
| 2,334,992 | 11/1943 | Crake | 61—46.5 |
| 2,525,955 | 10/1950 | Scott | 61—46.5 |
| 2,528,089 | 10/1950 | Siecke et al. | 61—46.5 |
| 2,540,878 | 2/1951 | Hayward | 61—46.5 |
| 2,551,375 | 5/1951 | Hayward | 61—46.5 |
| 2,580,911 | 1/1952 | Harris | 61—46.5 |
| 2,603,068 | 7/1952 | Wilson | 61—46.5 |
| 2,653,452 | 9/1953 | Dawson | 61—46.5 |
| 2,675,681 | 4/1954 | Dawson | 61—46.5 |
| 3,011,317 | 12/1961 | Wolff | 61—46.5 |
| 3,013,396 | 12/1961 | Suderow | 61—46.5 |
| 3,025,678 | 3/1962 | Dawson | 61—46.5 |

FOREIGN PATENTS

| | | |
|---|---|---|
| 713,298 | 8/1954 | Great Britain. |
| 273,163 | 3/1930 | Italy. |

OTHER REFERENCES

World Oil, February 1, 1950, pages 108, 110 and 112.

EARL J. WITMER, *Primary Examiner.*